US012599796B1

(12) United States Patent
Mejia

(10) Patent No.: US 12,599,796 B1
(45) Date of Patent: Apr. 14, 2026

(54) TRAINING DEVICE AND A METHOD OF USING THE SAME

(71) Applicant: Wlises Mejia, Miami, FL (US)

(72) Inventor: Wlises Mejia, Miami, FL (US)

( * ) Notice: Subject to any disclaimer, the term of this patent is extended or adjusted under 35 U.S.C. 154(b) by 327 days.

(21) Appl. No.: 18/432,314

(22) Filed: Feb. 5, 2024

Related U.S. Application Data

(60) Provisional application No. 63/444,424, filed on Feb. 9, 2023.

(51) Int. Cl.
*A62C 99/00* (2010.01)

(52) U.S. Cl.
CPC ................................ *A62C 99/0081* (2013.01)

(58) Field of Classification Search
CPC .......................... A62C 99/0081; A63B 23/047
See application file for complete search history.

(56) References Cited

U.S. PATENT DOCUMENTS 3,827,690 A * 8/1974 Rogers ................... A63B 69/34 473/445
3,889,949 A * 6/1975 Gardner ................. A63B 69/34 473/445
4,123,957 A * 11/1978 Niemela ............. B27B 17/0058 83/564
4,219,057 A * 8/1980 Falk .......................... B27L 7/00 144/195.1
4,241,772 A * 12/1980 Scherer ............... B27B 17/0075 248/176.1
4,302,008 A * 11/1981 Lard ...................... A63B 15/00 482/109
4,453,742 A * 6/1984 Zepkowski ............ A63B 69/18 280/22.1
4,468,018 A * 8/1984 Vaizey ................ B27B 17/0075 269/53
4,535,985 A * 8/1985 Mask ................. A63B 21/4029 482/138

(Continued)

FOREIGN PATENT DOCUMENTS

| | | |
|---|---|---|
| CN | 104080582 A | 10/2014 |
| DE | 29902963 U1 | 9/1999 |

*Primary Examiner* — Steve Rowland
(74) *Attorney, Agent, or Firm* — John Rizvi; John Rizvi, P.A.—The Patent Professor ®

(57) ABSTRACT

There is provided herein a training device, which can be used to advantage for the physical and professional training of fire fighters, specifically for training them in the chopping of wood with an axe. The device employs a weight sled, such as a common gym sled used in physical training exercises. The device has two elongate members emanating upwardly from the weight sled and a cross beam having an upper side and a lower side, the cross beam connecting by its lower side a set of two upper ends of the elongate members. The device also contains a housing affixed to the upper side of the cross beam, the housing having an open central portion and two opposing open receptacle end caps the open receptacles of the end caps facing each other along a longitudinal length of the cross beam, one of the opposing open receptable end caps having a door and a lock for the door. The method comprises providing a piece of wood inside the housing and engaging in cutting the same with an axe to provide for rigorous physical exercise and realistic training in ax techniques used by firefighters when fighting a fire.

20 Claims, 5 Drawing Sheets

(56) References Cited

U.S. PATENT DOCUMENTS

| | | | | |
|---|---|---|---|---|
| 4,564,178 | A * | 1/1986 | Steffe | B27B 17/0041 269/296 |
| 5,884,545 | A * | 3/1999 | Hamby, Jr. | B27B 31/006 83/167 |
| 6,599,206 | B1 | 7/2003 | Forrest, Sr. et al. | |
| 6,942,585 | B1 | 9/2005 | Krause | |
| 8,469,861 | B1 * | 6/2013 | McFee | A63B 21/0054 482/4 |
| 9,333,671 | B2 | 5/2016 | Huhtala et al. | |
| 9,808,953 | B1 * | 11/2017 | Sagorski | B25H 1/06 |
| D887,513 | S | 6/2020 | Pastrick | |
| 10,722,774 | B2 * | 7/2020 | Creech | A63B 69/34 |
| 11,103,942 | B2 * | 8/2021 | Prusakov | B27B 21/00 |
| 2005/0172765 | A1 * | 8/2005 | Moore | B27B 25/08 83/13 |
| 2005/0218577 | A1 * | 10/2005 | Kent | B25H 1/14 269/139 |
| 2008/0202317 | A1 * | 8/2008 | Capotosto | A63B 21/0004 84/422.4 |
| 2011/0224051 | A1 * | 9/2011 | Larish | A63B 21/0618 482/93 |
| 2013/0172160 | A1 * | 7/2013 | Poole | A63B 23/0458 482/129 |
| 2015/0335938 | A1 * | 11/2015 | Seen | A63B 23/1218 482/105 |
| 2018/0243597 | A1 | 8/2018 | Schlegel | |
| 2019/0275364 | A1 * | 9/2019 | Saunders | A63B 21/0004 |
| 2019/0291299 | A1 * | 9/2019 | Kverneland | B26D 1/10 |
| 2026/0015663 | A1 * | 1/2026 | Bobkov | C12Q 1/6876 |

* cited by examiner

TRAINING DEVICE AND A METHOD OF USING THE SAME

CROSS-REFERENCE TO RELATED APPLICATIONS

This application claims the benefit of U.S. Provisional Patent Application Ser. No. 63/444,424, filed on Feb. 9, 2023, which is incorporated by reference herein in its entirety.

FIELD OF THE INVENTION

The present invention relates generally to the field of training devices. More particularly, the present invention relates generally to physical training devices for improving physical health

BACKGROUND OF THE INVENTION

Physical training has been an ever increasing important aspect in maintain good health and general well-being. Physical training can vary greatly from simply walking all the way up to intensive weight lifting and cardiovascular exercises such as long distance running. In addition, an ever increasing aspect of physical training involves cross training using non-conventional equipment such as large ropes, jumping boxes, resistance cords, plyometrics and the like. These exercises tend to target a swath of different muscles and muscle groups which often work in conjunction with each other.

Often many cross fit exercises found in many gyms are based upon and derived from activities performed by those in various arduous occupations. For example, the use of large ropes in many gymnasiums to engage in various cross fits exercises is derived from the fact that many longshoremen have to handle heavy ropes in their job. Another example is the lifting and flipping of large tires that are often found in cross fit gyms, the use of which derives from that of tire mechanics such as tractor trailer tire mechanics who often have to handle such heavy tires in their profession.

In the inverse, many types of cross-fit exercises are geared towards specific sports, such as the use of a speed bag for boxers and the use of tackle sleds for football players. In addition, there is a rising trend in exercise training wherein the exercises are geared towards specific types of employment. For example, police officers are encouraged to engage in exercises which work on strength and agility, while EMT's often concentrate on exercises designed to build up their back muscles, which are all too often used to assist them in the heavy lifting involved with their work.

One profession that has also had exercises geared towards their profession is that of fire fighters. As an example, in training, often enough fire fighters will be made to carry heavy lengths of fire hose up multiple stories of a fire escape and will have to do so in very short periods of time. As another example, often fire fighters will be asked to employ a fire fighters' ladder and carry a full grown person down from a window height on their back as they maneuver the ladder.

However, these types of professional training exercises require significant equipment and as such do not very readily transfer to a gym environment. In addition, there still remain many areas of a fire fighters' job for which there are no currently available training exercises or gym equipment which may be used to prepare for these job requirements. This can be said to be the case because, while one can engage in various types of training, be it anaerobic, e.g., weight lifting, or aerobic, running, many job specific tasks for firefighters involve both strength and cardiovascular fitness, and thus, it is difficult to find one training activity that is realistically close to that part of a firefighter's job, while still being able to do that training exercise in the confines of a normal gym.

To further complicate the matter, most gym equipment can be quite costly, and as such, gym owners tend to be very hesitant to introduce a new piece of gym equipment, especially if the equipment is only applicable to a few patrons with specific needs. On the contrary, gym owners are constantly seeking new ways to employ their existing gym equipment to meet the specific needs of their patrons.

Accordingly, there remains a need for a solution to at least one of the aforementioned problems. For instance, there is an established need for a means of training for fire fighters that is sufficiently realistic to common firefighting activities, but which employs existing gym equipment that is readily available in most gyms.

SUMMARY OF THE INVENTION

The present invention can be directed to a device which permits a user to realistically handle an axe in a scenario similar to that which may confront a firefighter during their job. Often firefighters will have to chop through doors to access locked rooms or will have to chop through roof to release smoke from a building. The device described herein can be used in a gym environment to simulate such activities. The device herein employs a common gym sled with weights on it as a supporting base. The cylinders of the gym sled which are often used in pushing and pulling exercises of the gym sled, can serve herein as a means of elevation. The cylinders can support a cross beam on which a housing can be affixed, preferably at a waist or higher height, e.g, from about 25 inches to about 45 inches, preferably from about 28 to about 35 inches, most preferably about 30.25 inches, from the ground or from the runners width surface. The affixed housing can have a substantial portion thereof missing; so much so that only the ends caps of the housing are what is really present and adhered to the cross beam. One of the end caps can be openable on one end. Then using this opening, a very thick piece of wood, e.g., 4"×4", can be inserted in the housing. When the open end cap is closed, the wood is kept in a fixed immovable position. This permits a user to employ an axe to quickly cut the piece of wood and simulate cutting through a door or a door frame. In addition to training firefighters, the device can be used in the gym for ordinary people to exercise in a new way using existing equipment.

The term "about" as used herein can entail a variance of 10% greater or lower than the value recited.

The term "comprising" as used herein also encompasses the terms "consisting essentially of" and "consisting of".

The values of any endpoint(s) of any range(s) recited herein can be used to create different ranges or different endpoints of ranges described herein.

In a first implementation of the invention there can be provided a training device comprising:

- a gym sled
- two elongate members emanating upwardly from the gym sled;
- a cross beam having an upper side and a lower side, the cross beam connecting by its lower side a set of two upper ends of the elongate members; and, a housing affixed to the upper side of the cross beam, the housing having an open central portion and two opposing open receptacle end caps on opposite sides of the open central portion, the open receptacles of the end caps facing each other along a longitudinal length of the cross beam, one of the opposing open receptable end caps having a door and a lock for the door.

In one aspect of the invention, the weight sled can have two parallel sled runners, each sled runner having a front end and a rear end, Preferably the parallel sled runners can have a length of from about 500 millimeters (mm) up to 1,500 mm, more specifically from about 750 mm up to about 1,250 mm, most preferably about 1,000 mm. The parallel sled runners can be flat or raised. Preferably the sled runners can be flat rectangular sections and have upturned end portions and the sides of the sled runners can also be upturned, each for example being upturned about 25-50 mm. Preferably the parallel sled runners can be from about 500 mm up to about 700 mm apart, preferably from about 550 up to about 650 mm apart, most preferably about 600 mm.

In another aspect of the invention, the parallel sled runners can be connected therebetween by a platform capable of temporarily attaching weights thereto. Preferably the platform can be raised above the level of the sled runners, preferably from about 2 to about 4 inches above. The platform can have an upwardly facing cylinder. The upwardly facing cylinder can be of a length sufficient to support up to ten 45 pound (lb.) gym barbell weights threaded through by the cylinder. Preferably the upwardly facing cylinder can be from about 400 mm up to about 600 mm, more preferably from about 450 mm up to about 550 mm, most preferably about 470 mm. The diameter of the cylinder can be from about 40 mm up to about 60 mm, more preferably, about 50 mm.

In yet another aspect of the invention, the device can have an upwardly facing receptable located at the front ends of each parallel sled runner. Preferably the device can have upwardly facing receptacles at both the front ends and the rear ends of each parallel sled runner. The upwardly facing receptacles can be hollow cylinders and can be centrally located along the width of the sled runner and from 2-4 inches from the end of the sled runner length. The upwardly facing receptacles can be from 2 to 6 inches in height, preferably from 2 to 3 inches in height. The upwardly facing receptacles can be of any shape, but preferably can be square, rectangular, or circular, and preferably circular with a diameter of from about 40 mm to about 60 mm, more preferably about 50 mm. In one embodiment the upwardly facing receptacles can each be welded to the sled runner.

In yet even another aspect of the invention, the two elongate members emanating upwardly from the gym sled can be of any suitable height can preferably be from about 24 inches up to about 60 inches, and preferably from about 36 inches up to about 48 inches in height and be supported in the receptacles. The elongate members can in one non-limiting embodiment, be adjustable in height by utilizing a telescoping system of two elongate component members in one which members each have a series of holes along their length which can be locked in place at different heights by an interposing pin and cotter pin lock. The elongate members can be of any suitable shape, but preferably are square, rectangular, or circular shape, more preferably circular with a diameter of the elongate members being from 1 mm to 5 mm less than the diameter of the circular receptacles noted above. The elongate members can each preferably have a runner end and an opposing upper end. Preferably the ends of the elongate members can be identical and as such the runner end and the opposing upper end can each be the same. Preferably the elongate members can be inserted in the upwardly facing receptacles by their runner ends such that the two upper ends of the two elongate members extend up into the air.

In yet one other aspect of the invention, the cross beam can be a flat cross beam with downwardly facing width ends, i.e., where the width of the beam has downwardly extended sections at right angles continuously along the longitudinal length of the flat cross beam, wherein the downwardly facing width ends can be from about 1 inch up to about 6 inches, preferably about 1 to 3 inches downward so they cover a portion of the upwardly extending elongate members. In another embodiment the flat cross beam can have a length that corresponds to the distance between the parallel sled runners, e.g., from about 500 mm up to about 700 mm, preferably 550 mm up to 560 mm, and a width that is from about 3 inches up to about 6 inches, preferably about 4.2 inches to about 4.5 inches, most preferably about 4.39 inches.

In yet even one other aspect of the invention the lower side of the cross beam is connected to the two upper ends of the elongate members by any suitable manner, preferably by welding the upper ends of the elongate members to the lower side of the cross beam. In another embodiment, the lower side of the cross beam can have receptacles welded thereto, which are identical to the upwardly facing receptacles described herein except for the fact that they are downwardly facing receptacles welded to the lower side of the cross beam, and which downwardly facing receptacles can accommodate an upper end of the elongate members therein. In yet another embodiment, the downwardly facing receptacles can accommodate the upper ends of the elongate members which upper ends of the elongate members are welded therein. In one non-limiting embodiment, the elongate members being connected to the lower side of the cross beam can function as one ax-cutting attachment unit and can be removed from the gym sled upwardly facing receptacles and replaced with the conventional elongate members used with a gym sled when desired by another user of the equipment.

In yet still one other aspect of the invention, the housing can be welded to the upper side of the cross beam. The housing can be of a fixed size or can be adjustable. In one non-limiting embodiment, the housing can be adjustable by moving one or both of the open receptacle end caps along the upper side of the cross beam so as to be able to accommodate different lengths of wood therein. This can be done by any known method such as having a track or tracks lying on the upper side of the cross beam underneath the open receptacle end caps, which tracks have holes. The end caps can have spring pins inside the bottom portions thereof which can be raised and lowered to adjust the endcaps anywhere along the length of holes along the tracks.

In yet still even another aspect of the invention, the housing can be a fixed size and can be welded to the upper side of the cross beam. The housing can be of a size sufficient to accommodate and fix in place a length of wood of from about 1"×1" up to about 6"×6" and preferably is 4"×4". The length of the piece of wood can be from about 10 inches up to about 24 inches, preferably from about 11 inches up to about 20 inches, and most preferably about 12.25 inches. It will be understood herein that the "housing" will comprise the two opposing open receptacle end caps and the space therebetween along the upper surface of the platform, as well as the platform itself. Thus, the open portion can comprise a length which is about 2 to about 4 inches less in length than the length of the wood described herein above.

In another aspect of the invention, opposing end caps of the housing are identical in size and can be of any suitable size or shape, such as square, rectangular, or circular, preferably rectangular and of from about ¼ of an inch up to about 2½ inches greater in size than the dimensions for the piece of wood described herein above. Preferably the end-caps can be three sided (the fourth side being a raised platform fixed to the upper side of the crossbeam) with each side being from 1 inch up to about 3 inches, preferably about 2.25 inches in width and the length of longer vertical sides being from 2 inches up to about 6 inches, preferably about 3 inches up to about 5.75 inches, preferably about 4.39 inches, the cross length between the two vertical sides being the same as the width of the underlying cross beam as described above. In one embodiment, the inside of the housing can have a raised platform of from about ½ of an inch up to 1 inch which runs along a longitudinal length of the housing and occupies the entire lower area of the housing from the inside wall of one of the endcaps through to the inside wall of the other endcap. In one other non-limiting embodiment, the housing can have cushioning material inside the endcaps to reduce the noise of the wood moving in the housing and such material can be cloth, rubber material or foam In yet another aspect of the invention, the door of the receptacle end cap can be a hinged door.

In yet even another aspect of the invention, the lock of the receptacle end cap can comprise the components of a bracket on the outside of the door, a hole in the upper side of the cross beam immediately outside the door of the endcap and beneath the bracket, and a t-shaped locking pin which can pass through the bracket on the door and into the hole in the upper side of the crossbeam. Alternatively, it can be a T-shaped spring-locked handle. To open the door, the t-shaped locking pin can be pulled upward out of the hole and out of the bracket. To close the door the t-shaped locking pin can be re-inserted through the bracket and into the hole. The T-shaped locking pin can have width of the top of the T of from 2.5 to about 3 inches, preferably about 2.76 inches and can be made of thermoplastic polyurethane.

In a second implementation of the invention there can be provided herein a method of training comprising:

- providing a training device which comprises:
  - a gym sled
  - two elongate members emanating upwardly from the gym sled;
  - a cross beam having an upper side and a lower side, the cross beam connecting by its lower side a set of two upper ends of the elongate members; and,
- a housing affixed to the upper side of the cross beam, the housing having an open central portion and two opposing open receptacle end caps on opposite sides of the open central portion, the open receptacles of the end caps facing each other along a longitudinal length opening the door of the housing;
- inserting a piece of wood in the housing;
- closing the door of the housing; and,
- striking the wood in the housing through the open central portion thereof.

In one aspect of the method, the striking of the wood can be done with an axe, which can be a handheld axe or a full length axe. Alternatively, where more safety is desired, the striking of the wood can be done with a rubber mallet. The step of striking the wood can be conducted, preferably with the axe until the wood is cut through or substantially cut through e.g., ¾ through or greater.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1 and/or FIG. 8. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
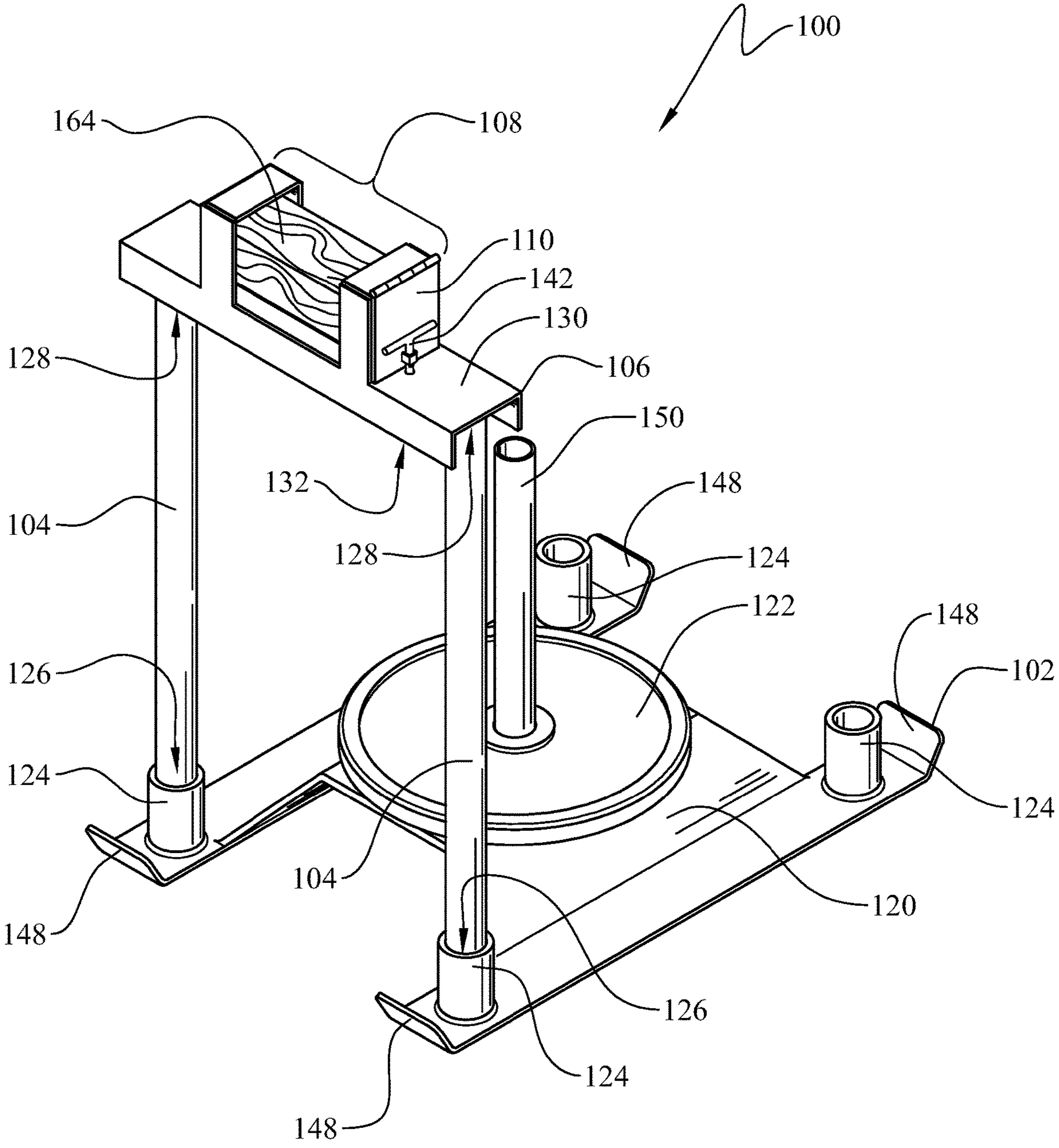
FIG. 1 present a perspective view of the device herein with a piece of wood in the housing and a weight on the platform.
Figure 2:
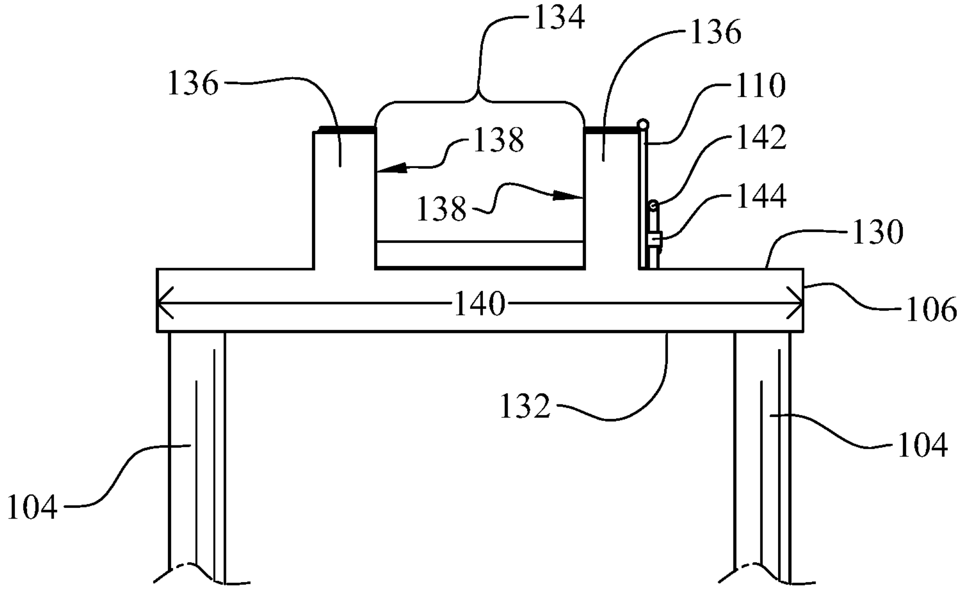
FIG. 2 presents a frontal enlarged view of the upper ends of the elongate members, the cross beam and the empty housing and door lock.
Figure 3:
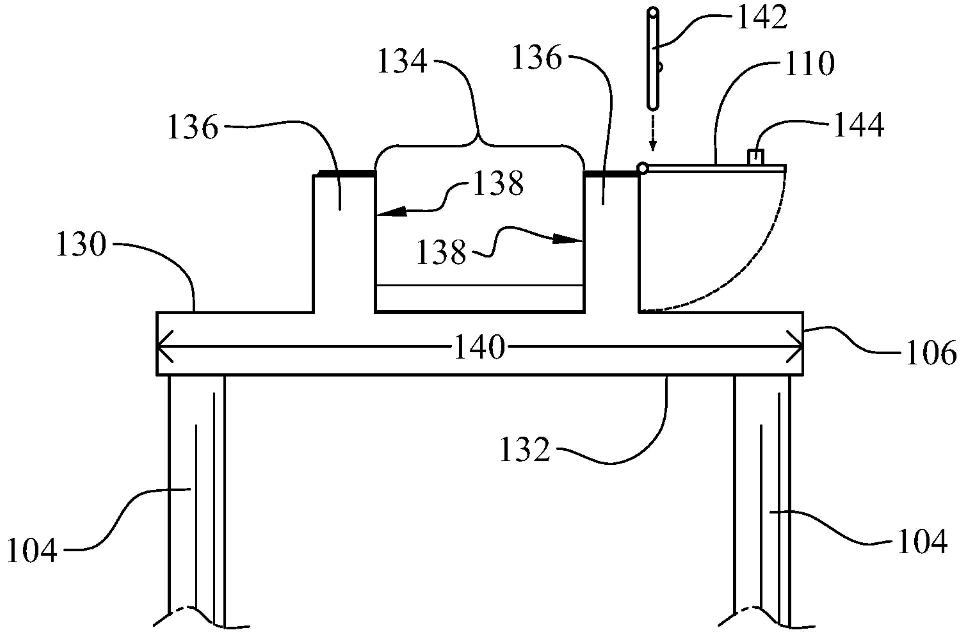
FIG. 3 presents the same view as FIG. 2 but with the locking pin removed and the housing door open
Figure 4:
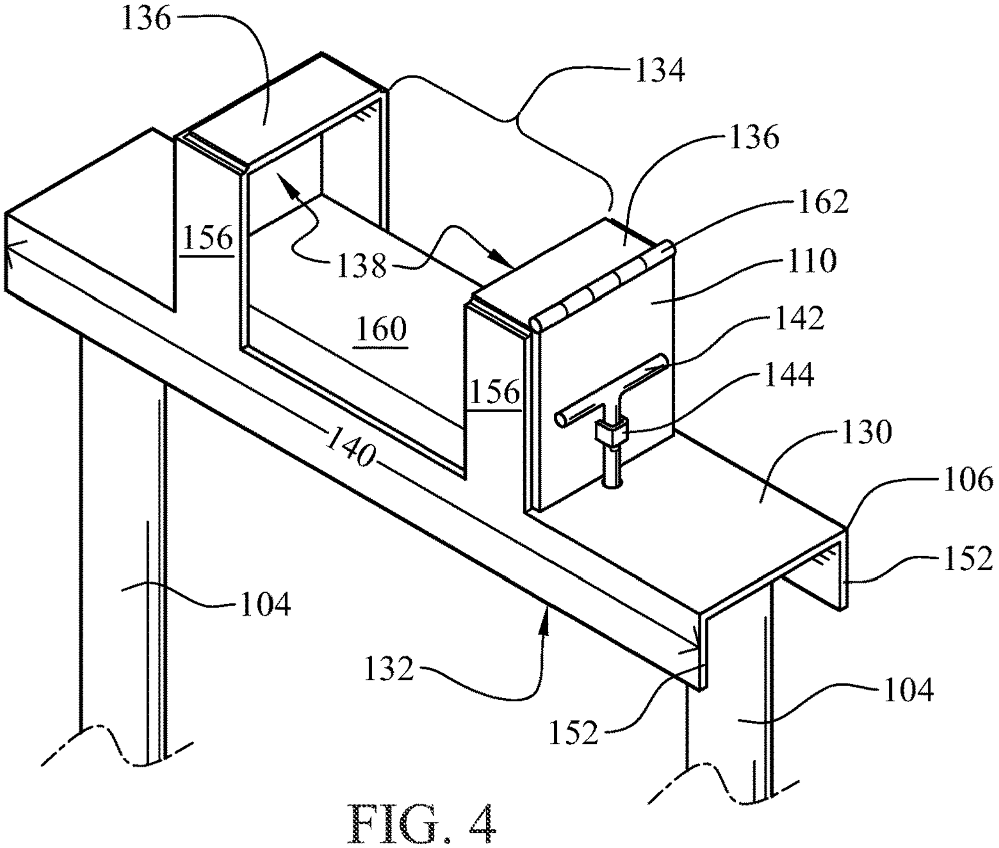
FIG. 4 presents a side perspective enlarged view of the upper ends of the elongate members, the cross beam and the empty housing and door lock.
Figure 5:
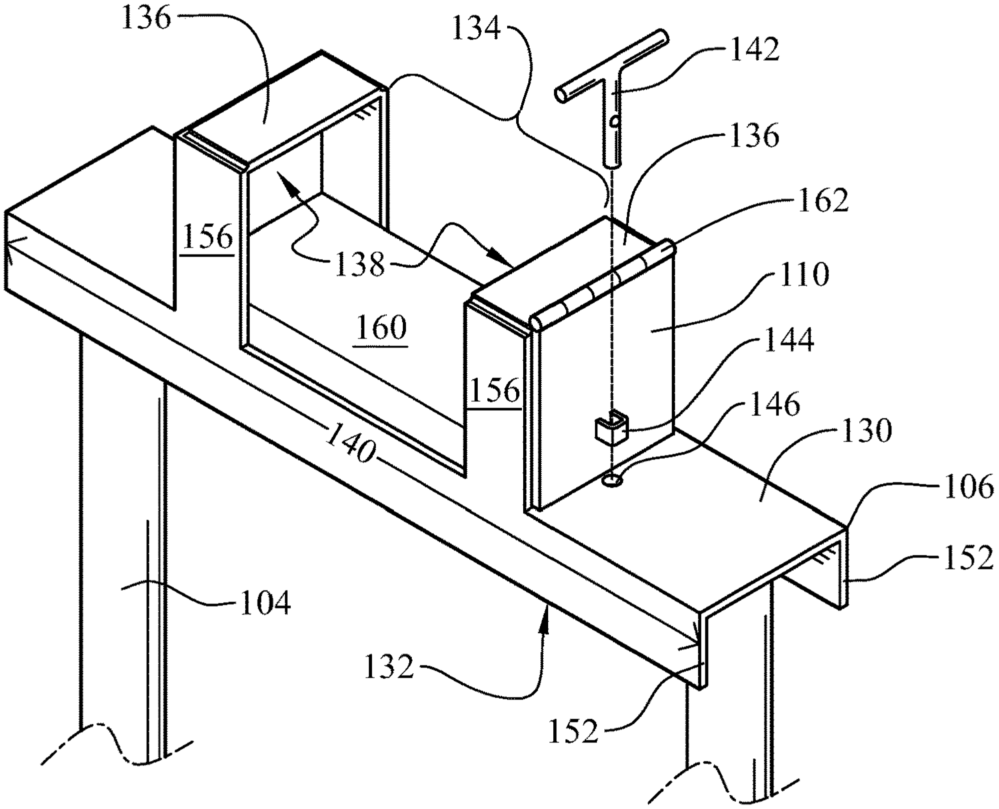
FIG. 5 presents the same side perspective view of FIG. 4 showing the removal of the t-shaped locking pin from the hole in the cross beam.
Figure 6:
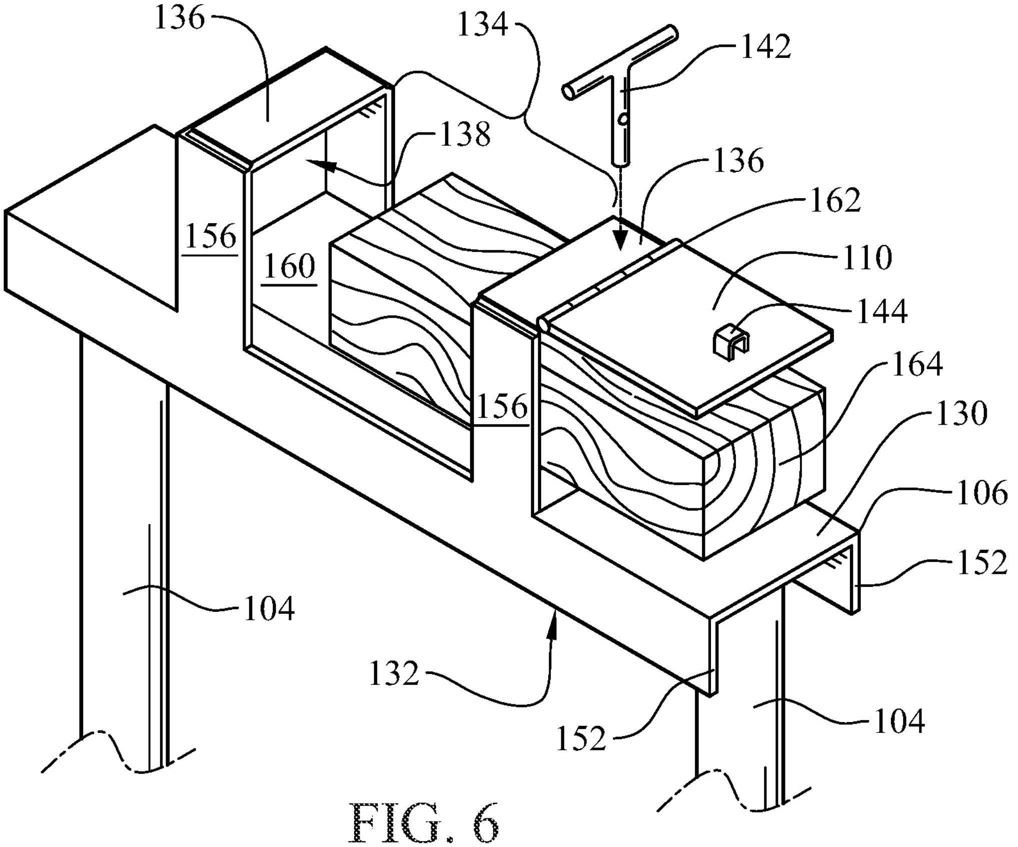
FIG. 6 presents the same side perspective view of FIG. 4 showing the opening of the end cap door and the partial insertion of the piece of wood.
Figure 7:
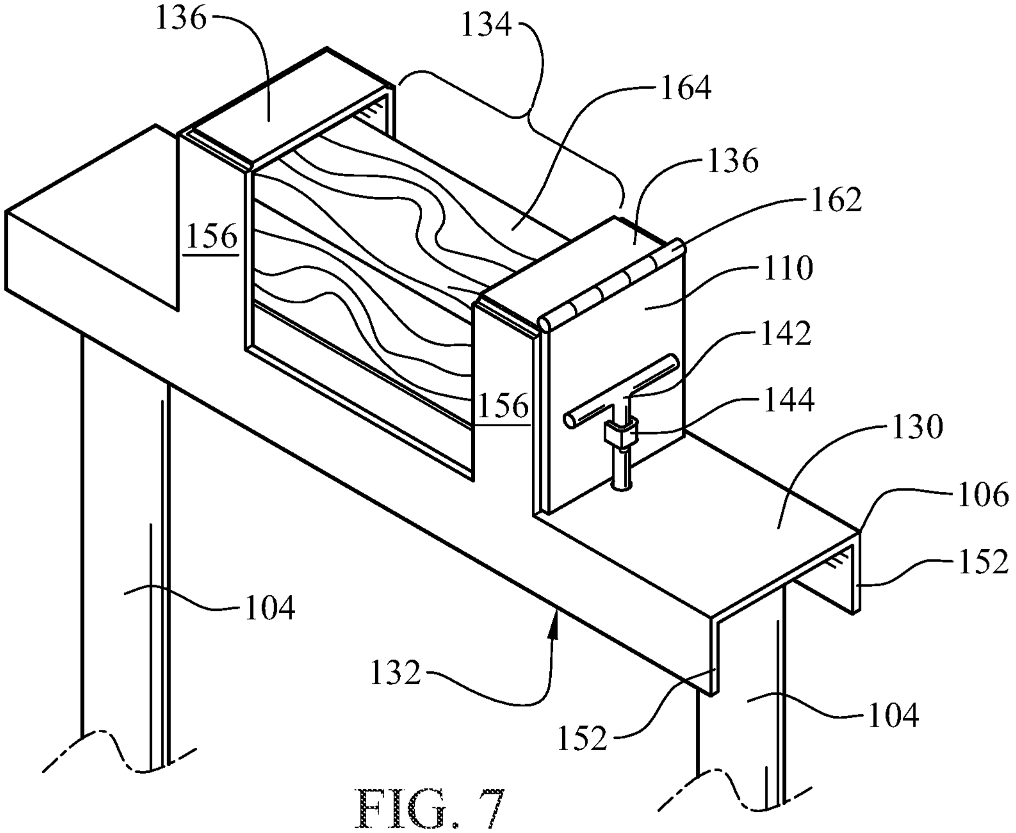
FIG. 7 presents the same side perspective view of FIG. 4 showing the closed endcap door and the inserted t-shaped locking pin in the hole in the crossbeam.
Figure 8:
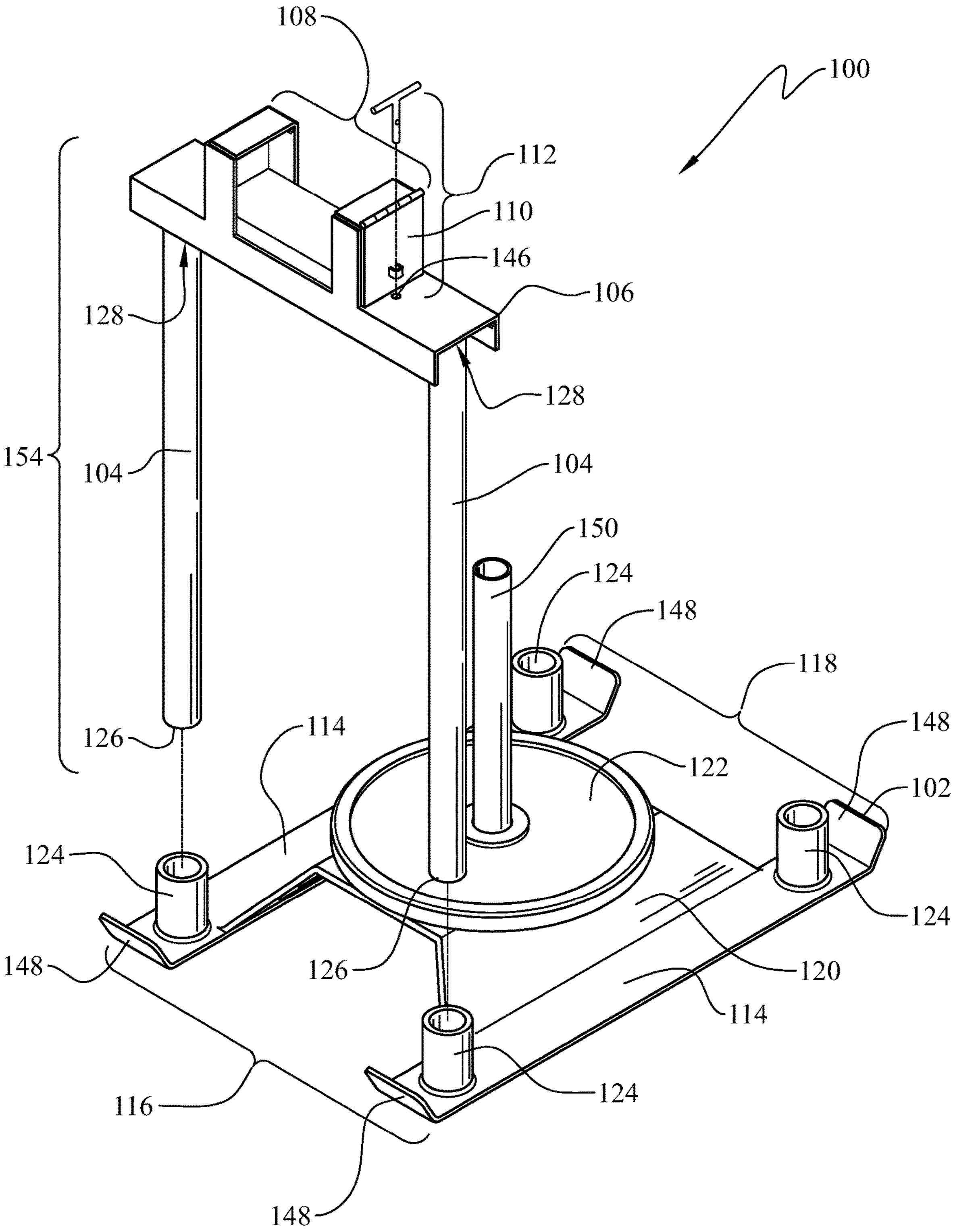
FIG. 8 presents a partially exploded view of the herein described unit comprising the elongate members, the cross beam, the housing, and the lock above the front upwardly facing receptacles of the underlying gym sled.

Referring initially to FIGS. 1 and 8, there is provided a training device 100. The training device 100 comprises a gym sled 102, two elongate members 104 which emanate upwardly from the gym sled 102, a cross beam 106, a housing 108, a door 110 and a lock 112 for the door 110. The gym sled 102 can have parallel sled runners 114, each of the sled runners having a front end 116 and a rear end 118. The sled runners 114 are connected therebetween by a platform 120 which is capable of temporarily attaching weights 122 thereto. The platform can have an upwardly facing cylinder Still referring to FIGS. 1 and 8, the training device 100 can also comprise upwardly facing receptacles 124 located at the front ends 116 of the sled runners 114. Each of the two elongate members 104 have a runner end 126 and an opposing upper end 128. Each of elongate members 104 can be situated by their runner ends 126 in one of the upwardly facing receptacles 124. In one embodiment a portion of the runner ends 126 and a portion of the upper ends 128, e.g., about from 1 to 4 inches from the respective ends can have a slightly smaller diameter, e.g., from about 1 mm up to about 3 mm such that they can be properly fitted in the upwardly facing receptacles 124, and any receptacles as such which may be located on the lower side 132 of the cross beam 106.

Referring now to FIGS. 1-8, the cross beam 106 can have an upper side 130 and a lower side 132. The cross beam 106 connects by its lower side 132 the upper ends 128 of the elongate members 104. Referring more specifically to FIGS. 2-7, the housing 108 can be affixed to the upper side 130 of the cross beam 106. The housing 108 can have an open central portion 134 and two opposing open receptacle end caps 136 located on opposite sides of the open central portion 134, the open receptacles 138 of the end caps 136 can face each other along a longitudinal length 140 of the cross beam 106. The end caps 136 can be three-sided which can be two identical vertical sides 156 and a connecting cross length side 158, and can have therein and along the entire length lower end of the housing 108 a platform 160, which can be a nylon block to protect the underlying metal from the axe.

One of the opposing open receptacle end caps 136 can have a door 110 along a face opposite that of the open receptacles 138 of the end caps 136. The door can have a hinge 162. The door 110 can have a lock 112 which lock can comprise a T-shaped locking pin 142, a bracket 144 which is mounted on the door 110, and a hole 146 in the cross beam 106, which accommodates the T-shaped locking pin 142 therein. Referring now to FIGS. 4-7, the cross beam 106 can have two downwardly facing width ends 152

Referring specifically to FIG. 8, the combination of the elongate members 104, the cross beam 106, the housing 108, the door 110 and they lock 112 can be identified as the ax-cutting attachment unit 154. The attachment unit 154 can be removed or placed in the upwardly facing receptacles 124 of the gym sled 102 by the runner ends 126 of the elongate members 104, when it is desired to cut the wood 164 as firefighter training or as an exercise in a gym.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A training device comprising:
a gym sled
two elongate members emanating upwardly from the gym sled;
a cross beam having an upper side and a lower side, the cross beam connecting by its lower side a set of two upper ends of the elongate members; and,
a housing affixed to the upper side of the cross beam, the housing having an open central portion and two opposing open receptacle end caps on opposite sides of the open central portion, the open receptacles of the end caps facing each other along a longitudinal length of the cross beam, one of the opposing open receptable end caps having a door and a lock for the door.

2. The training device of claim 1, wherein the housing has a top which is from 25 inches to about 45 inches above the ground.

3. The training device of claim 1, wherein the gym sled has two parallel sled runners.

4. The training device of claim 3, wherein, the parallel sled runners are connected therebetween by a platform capable of temporarily attaching weights thereto on an upwardly facing cylinder.

5. The training device of claim 3, wherein the parallel sled runners have an upwardly facing receptable located at the both longitudinal ends of each parallel sled runner.

6. The training device of claim 1, wherein, wherein the two elongate members emanating upwardly from the gym sled are adjustable in height.

7. The training device of claim 1, wherein the cross beam is a flat cross beam with downwardly facing width ends.

8. The training device of claim 1, wherein the lower side of the cross beam is connected to the two upper ends of the elongate members.

9. The training device of claim 1, wherein the lower side of the cross beam is releasably connected to the two upper ends of the elongate members.

10. The training device of claim 8, wherein the lower side of the cross beam has receptacles welded thereto, which are able to accommodate an upper end of the elongate members therein.

11. The training device of claim 1, wherein the housing is of a fixed size.

12. The training device of claim 1, wherein the housing is adjustable.

13. The training device of claim 1, wherein the housing further comprises a raised platform of which runs along a longitudinal length of the housing and occupies the entire lower area of the housing.

14. The training device of claim 1, wherein the raised platform is made of nylon.

15. The training device of claim 1, wherein the housing has cushioning material inside the endcaps.

16. The training device of claim 1, wherein the door of the receptacle end cap is a hinged door.

17. The training device of claim 1, wherein the lock of the receptacle end cap comprises a T-shaped spring-locked handle.

18. A method of training comprising:
providing a training device which comprises:
a gym sled
two elongate members emanating upwardly from the gym sled;

a cross beam having an upper side and a lower side, the cross beam connecting by its lower side a set of two upper ends of the elongate members; and, a housing affixed to the upper side of the cross beam, the housing having an open central portion and two opposing open receptacle end caps on opposite sides of the open central portion, the open receptacles of the end caps facing each other along a longitudinal length opening the door of the housing;

inserting a piece of wood in the housing;

closing the door of the housing; and, striking the wood in the housing through the open central portion thereof.

19. The method of claim 18, wherein the striking of the wood is done with an axe.

20. The method of claim 18, wherein the striking of the wood is done with a rubber mallet.

* * * * *